United States Patent
Chikkaveerappa et al.

(10) Patent No.: US 11,508,151 B2
(45) Date of Patent: *Nov. 22, 2022

(54) SYSTEMS AND METHODS FOR DEPICTING VEHICLE INFORMATION IN AUGMENTED REALITY

(71) Applicant: Capital One Services, LLC, McLean, VA (US)

(72) Inventors: Satish Chikkaveerappa, McLean, VA (US); Liju Mathews, McLean, VA (US); Ponnazhakan Subramanian, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/242,008

(22) Filed: Apr. 27, 2021

(65) Prior Publication Data
US 2021/0248374 A1    Aug. 12, 2021

Related U.S. Application Data

(63) Continuation of application No. 16/247,642, filed on Jan. 15, 2019, now Pat. No. 11,017,230, which is a
(Continued)

(51) Int. Cl.
*G06V 20/20* (2022.01)
*G06T 11/60* (2006.01)
(Continued)

(52) U.S. Cl.
CPC ............ *G06V 20/20* (2022.01); *G06F 40/279* (2020.01); *G06N 5/04* (2013.01); *G06Q 40/08* (2013.01);
(Continued)

(58) Field of Classification Search
CPC ........ G06V 20/20; G06F 40/279; G06N 5/04; G06Q 40/08; G06T 11/60; G07C 5/0825; G07C 5/085
(Continued)

(56) References Cited

U.S. PATENT DOCUMENTS 10,997,663 B1 * 5/2021 Wyatt .................... G06Q 40/08
2012/0194554 A1 * 8/2012 Kaino .............. G08B 13/19613
345/633

(Continued)

*Primary Examiner* — Hai Tao Sun
(74) *Attorney, Agent, or Firm* — Perkins Coie LLP

(57) ABSTRACT

Systems and methods are provided for depicting information about a vehicle in augmented reality. An exemplary method may include determining identification information of a vehicle based on input received from a client device and obtaining, from an information source, vehicle information based on the identification information. The method may also include analyzing the vehicle information using an artificial intelligence engine and extracting vehicle history data from the vehicle information based on the analysis. The method may also include identifying a portion of the vehicle associated with the vehicle history data and providing instructions, based on the vehicle history data, to an augmented reality-enabled device to superimpose an indicator on a visual representation of the vehicle at a location corresponding to the portion of the vehicle.

20 Claims, 8 Drawing Sheets

Related U.S. Application Data continuation of application No. 16/058,902, filed on Aug. 8, 2018, now Pat. No. 10,452,915.

(51) Int. Cl.
  *G06N 5/04* (2006.01)
  *G07C 5/08* (2006.01)
  *G06Q 40/08* (2012.01)
  *G06F 40/279* (2020.01)

(52) U.S. Cl.
  CPC .............. *G06T 11/60* (2013.01); *G07C 5/085* (2013.01); *G07C 5/0825* (2013.01)

(58) Field of Classification Search
  USPC ......................................................... 345/633
  See application file for complete search history.

(56) References Cited

U.S. PATENT DOCUMENTS

| | | | |
|---|---|---|---|
| 2012/0230548 A1* | 9/2012 | Caiman | G06V 20/56 382/104 |
| 2017/0061506 A1* | 3/2017 | Dow | G06Q 30/0278 |
| 2017/0293894 A1* | 10/2017 | Taliwal | G06V 10/462 |

* cited by examiner

SYSTEMS AND METHODS FOR DEPICTING VEHICLE INFORMATION IN AUGMENTED REALITY

CROSS REFERENCE RELATED TO APPLICATIONS

This application is a continuation of U.S. patent application Ser. No. 16/247,642 filed on Jan. 15, 2019, which is a continuation of U.S. patent application Ser. No. 16/058,902 filed Aug. 8, 2018, now U.S. Pat. No. 10,452,915 issued on Oct. 22, 2019. Each of the above-mentioned applications are incorporated herein in their entireties by reference.

TECHNICAL FIELD

The present disclosure relates generally to the field of information processing for presentation in augmented reality. More specifically, and without limitation, this disclosure relates to systems and methods for processing vehicle information based on vehicle history data and depicting the vehicle information inaugmented reality.

BACKGROUND

A challenge faced by a consumer when buying a car, especially a used car, is that there is no intuitive and economical way to determine whether a car is mechanically reliable, involves any accident, or has any hidden issue that is not readily appreciable by an average person. A car buyer may purchase a vehicle history report to examine the history of a car. However, such a report is typically not free of charge and the cost may add up when multiple reports are needed. In addition, even if a buyer manages to obtain a vehicle history report, information on the report may be difficult to understand. For example, such a report may be text-based and lack visual indications as to, for instance, the extent and severity of past accident(s). Moreover, to obtain the report, the buyer may be required to input the vehicle identification number (VIN), which is not always readily available.

Thus, there is a need for systems and methods capable of streamlining the car buying process by automatically obtaining vehicle information based on a picture of the vehicle, analyzing the vehicle information to extract vehicle history data, and presenting the vehicle history data in augmented reality to assist a buyer to make purchase decisions.

SUMMARY

In one aspect, a system is provided for depicting information about a vehicle in augmented reality. The system may include at least one processor in communication with a client device. They system may also include a storage medium storing instructions that, when executed by the at least one processor, cause the at least one processor to perform operations. The operations may include determining identification information of the vehicle based on input received from the client device. The operations may also include obtaining, from an information source, vehicle information based on the identification information. The operations may also include analyzing the vehicle information using an artificial intelligence engine and extracting vehicle history data from the vehicle information based on the analysis. In addition, the operations may include identifying a portion of the vehicle associated with the vehicle history data. The operations may further include providing instructions, based on the vehicle history data, to an augmented reality-enabled device to superimpose an indicator on a visual representation of the vehicle at a location corresponding to the portion of the vehicle.

In another aspect, a computer-implemented method is provided for depicting information about a vehicle in augmented reality. The method may include determining identification information of the vehicle based on input received from a client device. The method may also include obtaining, from an information source, vehicle information based on the identification information. The method may also include analyzing the vehicle information using an artificial intelligence engine and extracting vehicle history data from the vehicle information based on the analysis. In addition, the method may include identifying a portion of the vehicle associated with the vehicle history data. The method may further include providing instructions, based on the vehicle history data, to an augmented reality-enabled device to superimpose an indicator on a visual representation of the vehicle at a location corresponding to the portion of the vehicle.

In a further aspect, a non-transitory computer-readable medium is provided. The non-transitory computer-readable medium may store instructions executable by a processor to cause the processor to perform operations for depicting information about a vehicle in augmented reality. The operations may include determining identification information of the vehicle based on input received from the client device. The operations may also include obtaining, from an information source, vehicle information based on the identification information. The operations may also include analyzing the vehicle information using an artificial intelligence engine and extracting vehicle history data from the vehicle information based on the analysis. In addition, the operations may include identifying a portion of the vehicle associated with the vehicle history data. The operations may further include providing instructions, based on the vehicle history data, to an augmented reality-enabled device to superimpose an indicator on a visual representation of the vehicle at a location corresponding to the portion of the vehicle.

BRIEF DESCRIPTION OF THE DRAWINGS

The accompanying drawings, which are incorporated in and constitute apart of this specification, illustrate several embodiments and, together with the description, serve to explain the disclosed embodiments. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

The present disclosure describes systems and methods for depicting vehicle information in augmented reality. In this disclosure, the term "vehicle" includes any means of carrying or transporting people or goods, such as a car, a truck, a motorcycle, a bus, a tractor, a boat, a cart, a sled, an airplane, etc. In the following description, embodiments may be disclosed using a car as an example, but it is noted that systems and methods disclosed herein are also applicable to other types of vehicles.

In some embodiments, systems and methods disclosed herein may provide a car buyer a visual indicator of relevant information of a car, such as damages sustained in past accident(s), maintenance history, etc., where the visual indicator can be superimposed on a live picture of the car captured by a mobile device. The superimposed visual indicator, along with the live picture, may create an augmented reality (AR) depiction of the relevant information of the car. The buyer may activate the AR depiction by taking a picture of the car including vehicle identification information such as a plate number, which may be used to determine the vehicle identification number (VIN) of the car. Based on the VIN, vehicle information may be obtained from one or more information source such as a vehicle history report database, a vehicle insurance report database, and/or a vehicle registration database. The vehicle information may be analyzed by an artificial intelligence (AI) engine to extract vehicle history data, which may be used to generate instructions for AR depiction.

Figure 1:
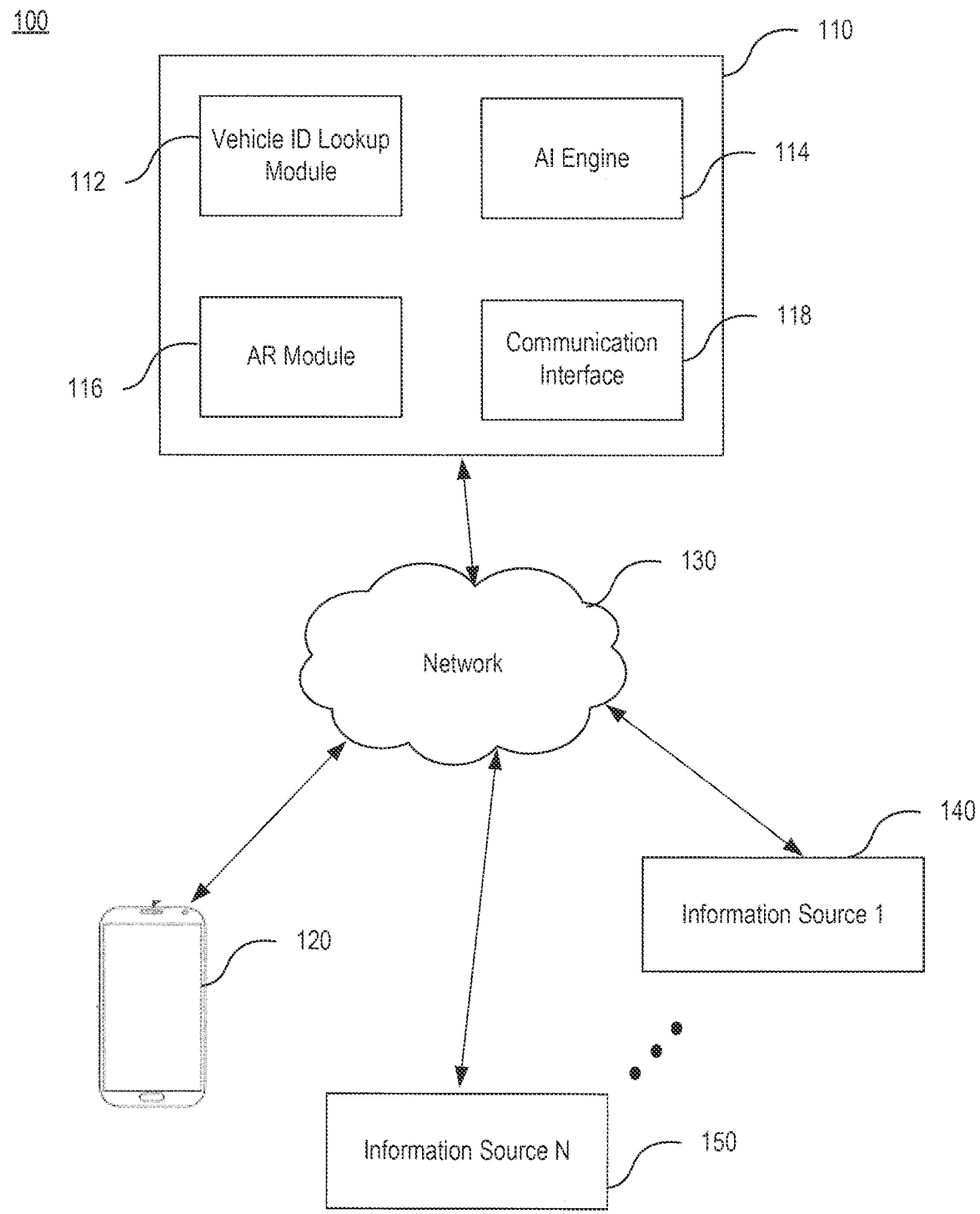
FIG. 1 is a block diagram of an exemplary system for depicting vehicle information in augmented reality, consistent with the disclosed embodiments.

FIG. 1 shows a diagram of an exemplary system 100 configured to depict vehicle information in augmented reality, consistent with disclosed embodiments. Methods disclosed herein may be implemented using system 100.

As shown in FIG. 1, system 100 may include a computer system 110, a client device 120, a network 130, and one or more information sources numbered from 1 to N. For simplicity, the beginning or first information source is referred to as 140, and the ending or last information source is referred to as 150. In the following, when referring to the collection of the information source(s), reference numeral "140-150" will be used. It is noted, however, that the phrase "information sources 140-150" may include only one information source or more than one information source. In some embodiments, client device 120, one or more of information sources 140-150, and/or network 130 may be omitted. For example, computer system 110 may have direct access to information sources 140-150 without using network 130.

Computer system 110 may include any number of computers, including server and workstation computers. Computer system 110 may include one or more processors, including Central Processing Units (CPUs) that have a single core or multiple cores, Graphical Processing Units (GPUs), integrated circuits (ICs), chips, microprocessors, microcontrollers, Digital Signal Processors (DSPs), Field-Programmable Gate Arrays (FPGAs), or other types of processors. Computer system 110 may be organized in a centralized or distributed manner. Components of computer system 110 may be integrated or provided as discrete units or modules, and the components may be interconnected via a network.

Information sources 140-150 may include a vehicle history report database. For example, information sources 140-150 may include a database provided by a car history report provider. Information sources 140-150 may also include a vehicle insurance report database. For example, information sources 140-150 may include a database provided by an insurance company storing insurance claim information, including accident reports, accident photos, payments, and other pertinent information. Information sources 140-150 may also include a vehicle registration database, such as a database provided by a government agency managing vehicle registration, car tax, or other regulatory aspects of owning and/or operating a vehicle.

Client device 120 may include a computing device configured to perform operations consistent with disclosed embodiments. For example, client device 120 may include at least one of a desktop computer, a laptop, a server, a mobile device (e.g., tablet, smart phone, etc.), a gaming device, a wearable computing device, or other type of computing device. Client device 120 may include one or more processors configured to execute software instructions stored in memory, such as memory included in client device 120. Client device 120 may include software that when executed by a processor performs network communication and content display processes. For instance, client device 120 may execute AR software that generates and displays interfaces including AR content on a display device included in, or connected to, client device 120. Client device 120 may execute applications that allow client device 120 to communicate with components of system 100 over network 130, and generate and display content in interfaces via a display device included in client device 120. The display device may be configured to display text, images, or videos relating to AR depiction of vehicle information. The disclosed embodiments are not limited to any particular configuration of client device 120. For instance, client device 120 can be a mobile device that stores and executes mobile applications that interact with computer system 110 and/or information sources 140-150 to perform aspects of the disclosed embodiments, such as processing information for depicting vehicle information in augmented reality.

Network 130 may be any type of network configured to provide communications between components of system 100. For example, network 130 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In some embodiments, one or more components of system 100 can communicate through network 130. In various embodiments, one or more components of system 100 may communicate directly through one or more dedicated communication links.

As shown in FIG. 1, computer system 110 may include a vehicle ID lookup module 112, an artificial intelligence (AI) engine 114, an augmented reality (AR) module 116, and a communication interface 118. Communication interface 118 may include any type of network adapter, such as an Ethernet adapter, a wireless network adapter, a fiber network adapter, etc., and configured to interface components of computer system 110 with client device 120 and/or information sources 140-150, either directly or via network 130, such that components of computer system 110 may communicate with one or more of client device 120 and/or information sources 140-150. For example, computer system 110 may access information stored in one or more of information sources 140-150 using communication interface 118.

Vehicle ID lookup module 112 may be configured to determine identification information of a vehicle such as VIN based on input received from client device 120. In some embodiments, a user of system 100 may take a picture of a car using, for example, client device 120. The picture may include information identifying the car such as a car registration number (also referred to as a plate number). Vehicle ID lookup module 112 may receive the picture and extract the registration number from the picture. Vehicle ID lookup module 112 may then lookup the VIN number based on the registration number. For example, vehicle ID lookup module 112 may access an information source (e.g., one of information sources 140-150), such as a vehicle registration database provided by a government agency which stores a mapping relationship between the registration number and the VIN. Based on the mapping relationship, vehicle ID lookup module 112 may determine the VIN corresponding to the registration number. Other types of information source may also be used to obtain the VIN information corresponding to the registration number, such as a vehicle history report database, a vehicle insurance report database, and/or a personal property database. In another example, vehicle ID lookup module 112 may access a local cache to determine a VIN corresponding to the registration number, before accessing an outside information source.

In some embodiments, a user may take a picture of a VIN directly, or a picture of a VIN barcode. Vehicle ID lookup module 112 may analyze the picture and extract the VIN information. In some embodiments, a user may input the VIN directly on client device 120, such as typing in the number of the VIN. Vehicle ID lookup module 112 may receive the user input and determine the VIN information based on the input.

In some embodiments, a user may input the vehicle registration number or VIN using voice input. Vehicle ID lookup module 112 may recognize the voice input and determine the VIN information based on the input.

In some embodiments, a VIN may be determined based on any image data of the vehicle that may be sufficient to identify a particular vehicle. For example, in some embodiments, a make, model, and year of a vehicle (and other identifying characteristics such as color, trim, and the like) may be determined from an image of the vehicle and cross-referenced with location or inventory data to determine the particular vehicle and thus the VIN.

After vehicle ID lookup module 112 determines the VIN of a vehicle, computer system 110 (e.g., using Al engine 114) may obtain vehicle information from one or more information sources based on the VIN. In some embodiments, the vehicle information may include a vehicle history report, and computer system 110 may obtain the vehicle history report from a vehicle history report database (e.g., one of information sources 140-150). In some embodiments, the vehicle information may include insurance claim information, and computer system 110 may obtain the insurance claim information from a vehicle insurance report database (e.g., one of information sources 140-150). Details regarding obtaining vehicle information will be discussed below.

Al engine 114 may be configured to analyze the vehicle information and to extract vehicle history data based on the analysis. For example, the vehicle information may include a vehicle history report, which may comprise text in natural language describing the history of a vehicle. Al engine 114 may recognize the vehicle history data from the text using a Natural Language Processing (NLP) algorithm. Examples of NLP algorithms include Apache Open NLP (a machine learning toolkit that provides functions such as tokenizers, sentence segmentation, part-of-speech tagging, named entity extraction, chunking, parsing, and coreference resolution), Natural Language Toolkit (NLTK) (a Python library that provides modules for processing text, classifying, tokenizing, stemming, tagging, parsing, etc.), Standford NLP (a suite of NLP tools that provide part-of-speech tagging, the named entity recognizer, coreference resolution system, sentiment analysis, etc.), and MALLET (a Java package that provides Latent Dirichlet Allocation, document classification, clustering, topic modeling, information extraction, etc.). In some embodiments, the vehicle history data may comprise accident information relating to an accident involving the vehicle. In some embodiments, the vehicle history data may comprise a maintenance history of the vehicle. Other types of vehicle history data may also be recognized. Based on the recognized vehicle history data, relevant vehicle information may be presented in augmented reality. Details regarding recognizing vehicle history data from the text of the vehicle information will be discussed below.

Al engine 114 and/or AR module 116 may be configured to identify a portion of the vehicle associated with the vehicle history data. In some embodiments, the vehicle history data may comprise accident information relating to an accident involving the vehicle. Al engine 114 and/or AR module 116 may be configured to identify a portion of the vehicle impacted by the accident. For example, the accident information may include a text description of the portion of the vehicle impacted by the accident, such as "front passenger side," "rear bumper on the left," or the like. Based on the test description, Al engine 114 and/or AR module 116 may identify the portion of the vehicle corresponding to the text description. In another example, the accident information may include one or more photos of the vehicle showing the damages sustained in the accident. Al engine 114 and/or AR module 116 may identify the portion of the vehicle corresponding to the photo(s) for AR depiction. Details regarding identifying vehicle portion(s) associated with vehicle history data will be discussed below.

In some embodiments, the identified portion may be represented as text description of the portion, such as "front passenger side," "rear bumper on the left," etc. In some embodiments, the identified portion may be encoded using a set of simplified notes, such as using FPO to refer to front passenger side door, and ROB to refer to reardriver side bumper, etc. In some embodiments, the portion may be represented in picture forms, such as a 2D or 3D image of the portion, location of the portion in terms of pixel numbers in an image of the vehicle, or other suitable ways to indicate the portion with respective to images of the vehicle. In any case, the information of the portion, such as the size, shape, and location information of the portion, may be saved and used to render an AR depiction of the vehicle.

AR module 116 and/or Al engine 114 may also be configured to provide instructions, based on the vehicle history data, to an AR-enabled device, such as client device 120, to superimpose an indicator on a visual representation of the vehicle at a location corresponding to the portion of the vehicle. In some embodiments, the indicator may comprise a mark representing a degree of damages sustained in the accident. For example, based on the vehicle history data, AR module 116 and/or Al engine 114 may assess the degree of damage based on the text description of the damage. For example, the degree of damage may be assessed based on recognizing text in a vehicle history report describing the damage, such as "minor," "moderate," "severe," etc. Based on the assessment, a degree of damages may be determined, such as on a 1-5 scale, which may be used to render the mark according to the degree. For example, a higher degree of damages may be depicted using a darker color or a more reddish color, while a lower degree of damages may be depicted using a lighter color or a more greenish color. In some embodiments, the accident information may comprise an image of the vehicle depicting damages sustained in the accident (e.g., obtained from a vehicle insurance report database), and the indicator may comprise the image of the vehicle depicting damages sustained in the accident. For example, one or more photos showing actual damages may be superimposed on a live picture of the vehicle at the location of the damages. In this way, a consumer may be provided with an intuitive and informative way to understand important vehicle information. Details regarding depicting vehicle information in AR will be discussed below.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
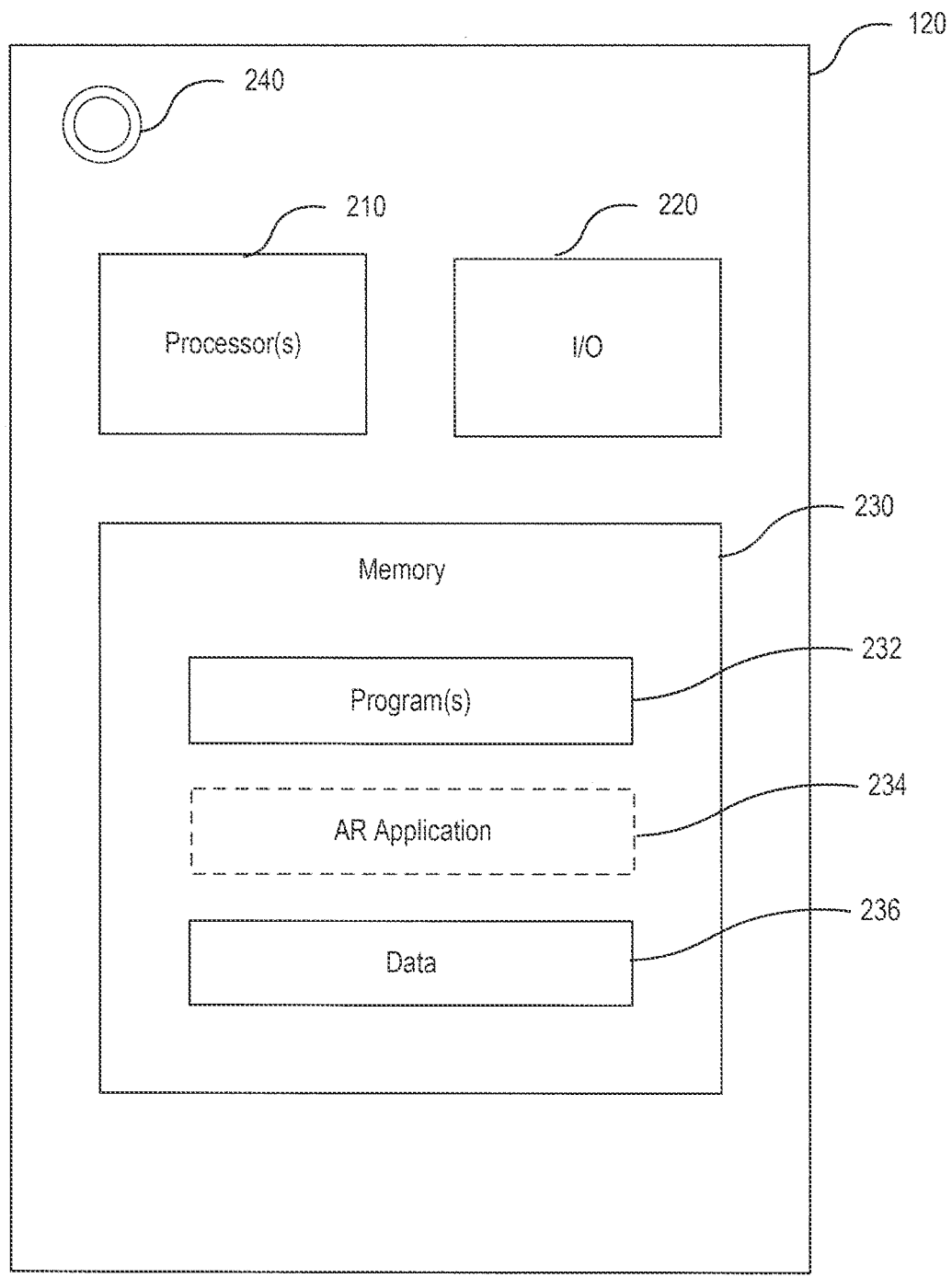
FIG. 2 is a block diagram of an exemplary client computing system, consistent with the disclosed embodiments.

FIG. 2 is a block diagram showing exemplary components of client device 120, in accordance with disclosed embodiments. As shown in FIG. 2, client device 120 may include one or more processors 210, an image sensor 240, an input/output (1/0) system 220, and a memory 230. In some embodiments, client device 120 may take the form of a mobile computing device (e.g., a wearable device, smartphone, tablets, laptop, or similar device), a desktop computer (e.g., a workstation or similar device), a laptop computer, or other computing devices. Alternatively, client device 120 may be configured as a particular apparatus, embedded system, dedicated circuit, and the like based on the storage, execution, and/or implementation of the software instructions that perform operations consistent with the disclosed embodiments.

Processor(s) 210 may include one or more processing devices, such as microprocessors, Central Processing Units (CPUs), Graphical Processing Units (GPUs), Digital Signal Processors (DSPs), Field Programmable Gated Arrays (FPGAs), etc. As would be appreciated by one of skill in the art, the disclosed embodiments are not limited to a particular processor type.

Memory 230 may include one or more storage devices configured to store instructions for performing operations related to disclosed embodiments. For example, memory 230 may be configured with software instructions, such as program(s) 232, that when executed by processor(s) 210, can cause client device 120 to perform operations according to the disclosed embodiments. The disclosed embodiments are not limited to separate programs or computers configured to perform dedicated tasks. For example, client device 120 can be configured to perform the disclosed functions of client device 120 by one or more programs stored in memory 230 (e.g., program(s) 232). In some aspects, memory 230 can be configured to store data 236 used by program(s) 232.

In certain embodiments, memory 230 may store an AR application 234 that may be executed by processor(s) 210 to perform one or more AR related processes consistent with disclosed embodiments. In certain aspects, AR application 234, or another software component, may be configured to receive AR instructions from computer systems 110 and/or display AR contents on client device 120 (e.g., on a display device of client 120 as part of 1/0 system 220). In some embodiments, the AR functionalities may be implemented by program(s) 232, without using a dedicated AR application such as 234. Thus, AR application 234 is represented using a dashed-line box in FIG. 2, indicating that it can be omitted in some embodiments.

1/0 system 220 may include one or more devices configured to allow data to be received and/or transmitted by client device 120 and to allow client device 120 to communicate with other machines and devices, such as other components of system 100, and to communicate with a user of client device 120. For example, 1/0 system 220 may include a screen of display device for providing information, such as AR contents, to the user. 1/0 system 220 may also include components for network communication such as wired or wireless network communication, and/or short-range communication such as Bluetooth, NFC, or the like. 1/0 system 220 may also include one or more digital and/or analog devices that allow a user to interact with client device 120 such as a touch-sensitive area, buttons, a keyboard, and/or one or more microphones (e.g., for receiving voice input). 1/0 system 220 may also include other components known in the art for interacting with computer system 110, other components of system 100, and/or a user of client device 120.

In some embodiments, client device 120 may include an image sensor 240 (e.g., a digital camera). Image sensor 240 may be configured to take still images (e.g., images of a vehicle, its registration number, its VIN number, its VIN barcode, etc.) and moving images (e.g., a live video of a vehicle). A still image or moving image may be used for augmented reality rendering (e.g., by superimposing relevant vehicle information onto the image).

The components of client device 120 may be implemented in hardware, software, or a combination of both hardware and software, as will be apparent to those skilled in the art.

Figure 3:
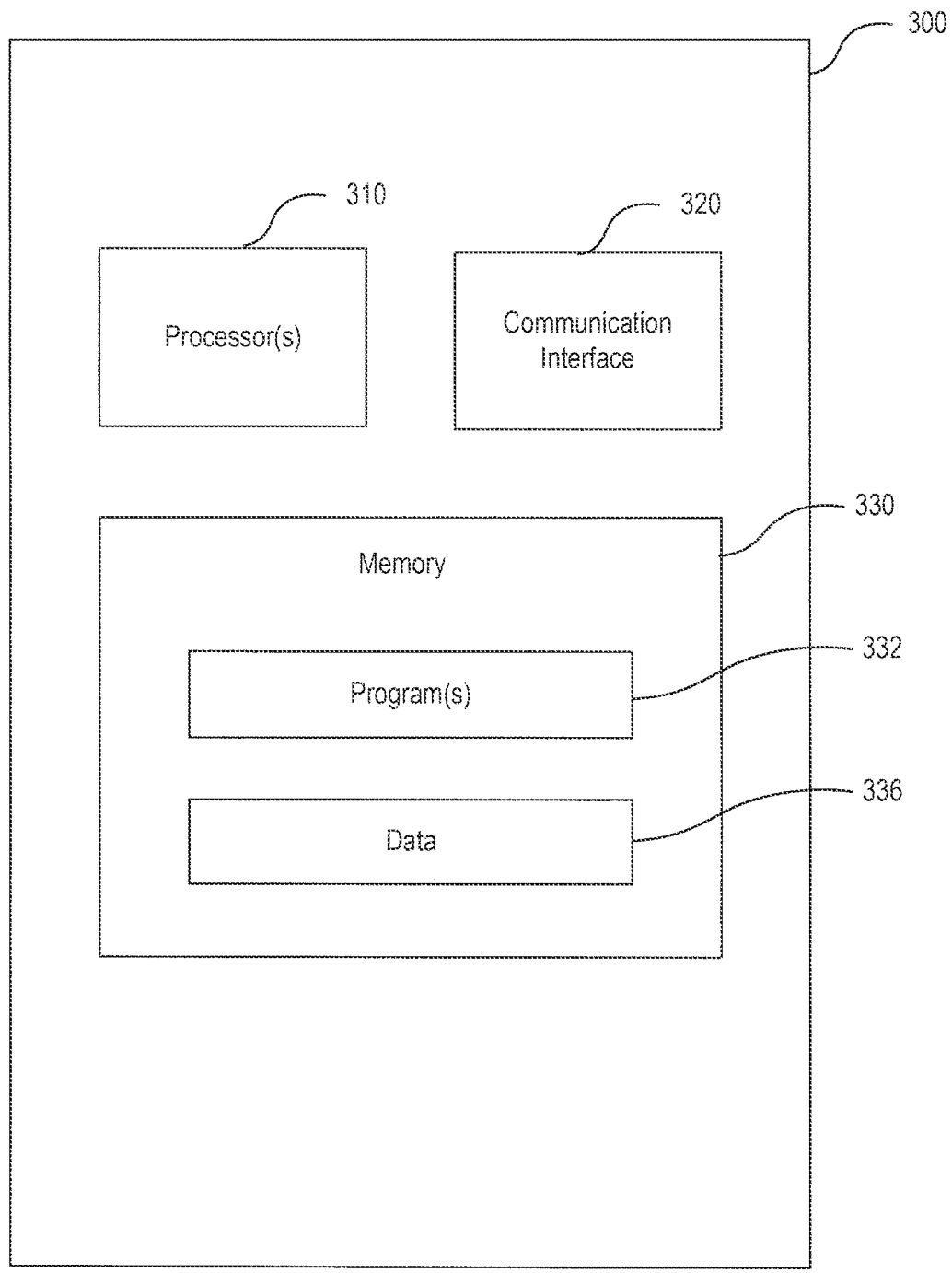
FIG. 3 is a block diagram of an exemplary server computing system, consistent with the disclosed embodiments.

FIG. 3 is a block diagram of an exemplary computing system 300, which may be included in computer system 110 and/or one or more of information sources 140-150 to implement their respective functionalities, in accordance with disclosed embodiments. Computing system 300 may include a communication device 320, one or more database processors 310, and memory 330 including one or more programs 332 and data 336. In some embodiments, computing system 300 may include one or more computing devices (e.g., desktops, workstations, servers, and computing clusters).

Communication device 320 may be configured to communicate with one or more components of system 100, such as computer system 110, information sources 140-150, and/or client device 120. In particular, communication device 320 may be configured to receive an image containing a vehicle or vehicle identification information from client device 120, obtain vehicle information from one or more information sources 140-150, and provide instructions to client device 120 to display AR contents.

Processor(s) 310 may include one or more processing devices such as CPUs, GPUs, DSPs, FPGAs, and microprocessors. Processor(s) 310 may include general purposed processing devices and/or specific purposed processing devices such as AI- and AR-specific processors. For example, an AI-specific processor (e.g., a Tensor Processing Unit developed by Google or a Neural Network Processor developed by Intel) may be optimized to perform AI-related computational tasks such as convolution and tensor operations. In another example, an AR-specific processor (e.g., an XR1 processor developed by Qualcomm) may be optimized to perform AR-related computational tasks such as real-time 3D image rendering.

Processor(s) 310 may constitute a single-core or multiple-core processor that executes parallel processes simultaneously. For example, processor 310 may be a single-core processor configured with virtual processing technologies. In certain embodiments, processor(s) 310 may use logical processors to simultaneously execute and control multiple processes. Processor(s) 310 may implement virtual machine technologies, or other known technologies to provide the ability to execute, control, run, manipulate, store, etc. multiple software processes, applications, programs, etc. In another embodiment, processor(s) 310 may include a multiple-core processor arrangement (e.g., dual, quad core, etc.) configured to provide parallel processing functionalities to allow computing system 300 to execute multiple processes simultaneously. One of ordinary skill in the art would understand that other types of processor arrangements could be implemented that provide for the capabilities disclosed herein. The disclosed embodiments are not limited to any type of processor(s) configured in computing system 300.

Memory 330 may include one or more storage devices configured to store instructions executable by processor(s) 310 to perform operations associated with the disclosed embodiments. The disclosed embodiments are not limited to separate programs or computers configured to perform dedicated tasks. For example, memory 330 may include one or more programs 332 that performs the functions of computing system 300, or program(s) 332 could comprise multiple programs. Additionally, processor(s) 310 may execute one or more programs located remotely from computing system 300. For example, computer system 110 may, via computing system 300 (or variants thereof), access one or more remote programs that, when executed, perform functions related to certain disclosed embodiments. In some embodiments, program(s) 332 may be stored in an external storage device, such as a cloud server located outside of computing system 300, and processor(s) 310 may execute program(s) 332 remotely.

Program(s) 332 may include software implementation of one or more functional modules such as vehicle ID lookup module 112, AI engine 114, AR module 116, and communication interface 118. In some embodiments, processor(s) 310 may execute program(s) 332 to perform the disclosed functionalities of vehicle ID lookup module 112, AI engine 114, AR module 116, and/or communication interface 118.

Data 336 may include any type of information in any format that system 100 may use to perform operations consistent with the disclosed embodiments. For example, data 336 may include such data as vehicle identification information, vehicle history data, vehicle history report information, insurance claim information, photos showing accident damages, or other pertinent information.

Memory 330 may store instructions to enable processor(s) 310 to execute applications, such as AI and AR applications, network communication processes, and any other type of application or software, including software directed to depicting vehicle information in AR according to the disclosed embodiments. Alternatively, the instructions, application programs, etc., may be stored in an external storage in communication with computing system 300 via network 130 or any other suitable network. Memory 330 may be a volatile or non-volatile, magnetic, semiconductor (e.g., EEPROM, flash memory, etc.), tape, optical, removable, non-removable, or other type of storage device or tangible (i.e., non-transitory) computer-readable medium.

As discussed above, computer system 110 may include at least one computing system 300. Further, although sometimes discussed here in relation to computer system 110, it should be understood that variations of computing system 300 may be implemented in other components of system 100, including one or more of information sources 140-150. Computing system 300 may be a single server or may be configured as a distributed computer system including multiple servers or computers that interoperate to perform processes and functionalities associated with the disclosed embodiments.

The following processes are exemplary implementations of AR depiction of vehicle information based on AI analysis, consistent with disclosed embodiments. These processes may be performed by various aspects and components of system 100, as is apparent from the disclosure.

Figure 4:
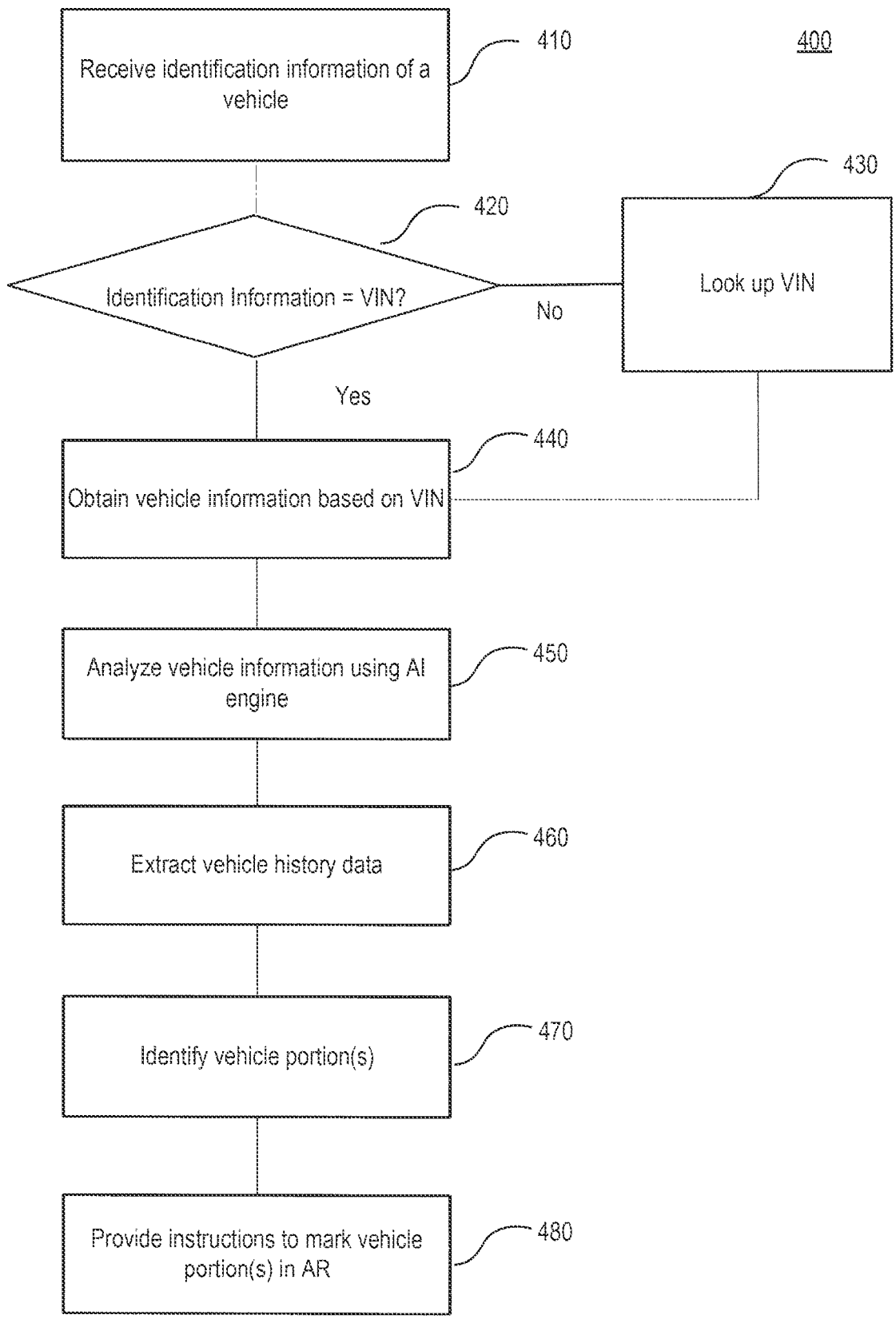
FIG. 4 is a flowchart of an exemplary process of depicting vehicle information in augmented reality, consistent with the disclosed embodiments.

FIG. 4 is a flowchart of an exemplary process 400 for depicting vehicle information in AR, consistent with disclosed embodiments. In step 410, vehicle ID lookup module 112 may receive identification information of a vehicle. For example, a user of client device 120 may take a picture of a car or a picture that includes the car's registration number (e.g., on a registration plate). Client device 120 may then send the picture (or stream image data) to vehicle ID lookup module 112 via, for example, network 130. In some embodiments, client device 120 may preprocess the picture and extract the registration number from the picture and send the extracted registration number to vehicle ID lookup module 112.

Other ways to provide the vehicle identification information may also be used. For example, the user may take a picture of the registration number, a picture of the VIN, or a picture of the VIN barcode using client device 120. In another example, the user may provide the registration number or VIN using voice input. For example, the user may read the registration number or VIN to a microphone of client device 120. In yet another example, the user may type in the registration number or VIN using, for example, a keyboard of client device 120. In any case, client device may preprocess the input by extracting the registration number or VIN and send the extracted information to vehicle ID lookup module 112, or send the input information to vehicle ID lookup module 112 without preprocessing.

After receiving the identification information of a vehicle such as a registration number or a VIN, vehicle ID lookup module 112 may, in step 420, determine whether the received vehicle identification information is the VIN. If the received vehicle identification information is not the VIN, then method 400 proceeds to step 430, in which vehicle ID lookup module 112 may look up the VIN corresponding to the received vehicle identification information, such as the registration number or other identifying features of the vehicle. In some embodiments, vehicle ID lookup module 112 may access a vehicle registration database (e.g., one of information sources 140-150), such as a database provided by a government agency administrating vehicle registration affairs. In some embodiments, vehicle ID lookup module 112 may look up the VIN in a cache (e.g., a local cache) before accessing an information source. After vehicle ID lookup module 112 determines the VIN, method 400 proceeds to step 440, which will be discussed below.

Figure 5:
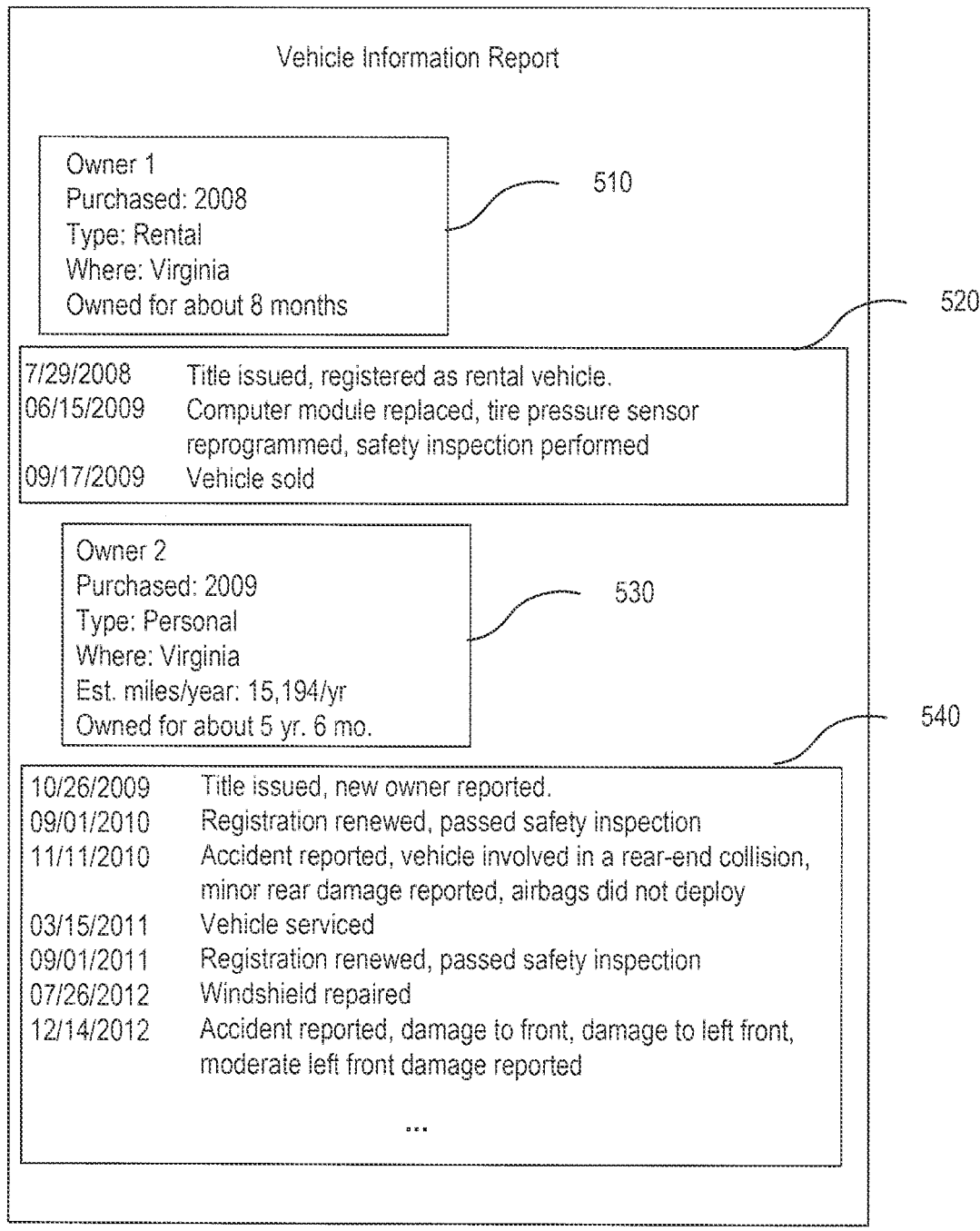
FIG. 5 shows an exemplary vehicle information report, consistent with the disclosed embodiments.

On the other hand, if the received vehicle identification information is the VIN, then method 400 proceeds to step 440, in which computer system 110 may obtain vehicle information based on the VIN. In some embodiments, the vehicle information may include a vehicle history report containing vehicle history information such as the owner(s)

of the vehicle, make/model/trim/year of the vehicle, odometer information, past accident report(s), maintenance/service records, inspection records, recalls, sale records, and other patient information. FIG. 5 shows an exemplary vehicle history report 500, according to some embodiments. Referring to FIG. 5, report 500 may include past owner information (e.g., 510, 520) and vehicle history information (e.g., 520, 540). The past owner information may include such information as the year of purchase, type of use (e.g., rental or personal), place of purchase, time period of ownership, estimated miles per year, etc. The vehicle history information may include such information as the date of purchase, inspection records, service records, accident reports, etc.

Report 500 may be text-based, containing text description of the vehicle information using natural language, as shown in FIG. 5. While system 100 may provide the text-based report directly to a user, the information contained within the report may be difficult to understand and appreciate. To provide a more intuitive way of presenting vehicle information, AI engine 114 may analyze the vehicle information in step 450, and extract vehicle history data in step 460. In some embodiments, AI engine 114 may analyze vehicle information, such as vehicle history report 500, using a Natural Language Processing (NLP) algorithm to recognize the vehicle history data from the text. For example, AI engine 114 may use a Text Converter API to convert the vehicle history report into raw data to allow information on the report to be transformed to readable and organized searchable data according to the topics and context of the text. AI engine 114 may then perform document-level context analysis (e.g., in step 450) and data extraction (e.g., in step 460) including entity extraction, concept extraction, and summarization. In some embodiments, AI engine 114 may perform the analysis and/or extraction using text recognition technologies such as optical character recognition (OCR) (e.g., recognizing typewritten text, one glyph or character at a time) and optical word recognition (e.g., recognizing typewritten text, one word at a time). The text recognition operations may be performed in three phases: pre-processing, recognition, and post-processing.

In the pre-processing phase, images (e.g., images of the vehicle history report) may be pre-processed to improve the chances of successful recognition. The pre-processing may include a de-skew process. In some cases, the document/image to be recognized may not be aligned properly. AI engine 114 may de-skew the document/image by tilting it a few degrees clockwise or counterclockwise to align the lines of text horizontally or vertically. The pre-processing may also include a de-speckle process to remove positive and/or negative spots, and to smooth edges.

In the text recognition phase, one or more algorithms may be used to produce a ranked list of candidate characters or words, as discussed below. One algorithm uses matrix matching to compare an image to a stored glyph on a pixel-by-pixel basis. This algorithm may rely on the input glyph being correctly isolated from the rest of the image, and on the stored glyph being in a similar font and at the same or similar scale. This technique may work well with typewritten text but may not work well when new fonts are encountered.

Another algorithm uses feature extraction to decompose glyphs into features, such as lines, closed loops, line direction, and line intersections. This decomposition may reduce the dimensionality of the representation and improve the computational efficiency of the recognition process. The features may be compared with an abstract vector-like representation of a character, which may reduce to one or more glyph prototypes. Feature detection techniques in computer vision may be used in the text recognition process. Feature extraction-based text recognition may be more effective than matrix matching-based algorithm in recognizing handwritten text or text with non-regular font or non-uniform size. Nearest neighbor classifiers such as the k-nearest neighbors algorithm can be used to compare image features with stored glyph features and choose the nearest match.

In the post-processing phase, the accuracy of the text recognition may be improved by constraining the recognized text with a lexicon, which is a list of words that are allowed to occur in a document. For example, the lexicon may include all the words in the English language, or a more specific or technical set of words for a specific field. Alternatively, a lexicon or dictionary may be used to influence the character or word segmentation in the text recognition phase to improve accuracy.

An example vehicle history report 500 is depicted in FIG. 5. AI engine 114 may perform text recognition to recognize the information on the report. For example, AI engine 114 may analyze report 500 using an NLP algorithm to recognize the contents of report 500. Then, AI engine 114 may extract car history data based on the analysis, such as the accident information relating to the accidents reported on Nov. 11, 2010 and Dec. 14, 2012, as shown in text block 540. Based on the accident information, AI engine 114 may obtain additional information relating to the accident, such as one or more photos showing the damages sustained in the accident. In some embodiments, AI engine 114 may obtain the photos from a vehicle insurance report database (e.g., one of the information sources 140-150), where photos showing accident damages may be accompanied with insurance claim requests or reports. In some embodiments, insurance reports relating to the vehicle may be obtained independently, for example based on the VIN of the vehicle.

In another example, AI engine 114 may extract service or maintenance records from report 500 in step 460. For example, AI engine 114 may extract the service record of Mar. 15, 2011, repair record of Jul. 26, 2012, and/or registration and inspection record of Sep. 1, 2011 from text block 540.

AI engine 114 may analyze, in step 450, other types of vehicle information, such as a scanned car Insurance ID, a scanned accident report, accident images, etc., and extract, in step 460, vehicle history data based on the analysis. For example, computer system 110 may obtain an accident report directly from, for example, a law enforcement agency (e.g., one of the information sources 140-150), based on the VIN or other vehicle identification information in step 440. AI engine 114 may analyze the accident report in a similar manner as discussed above, in step 450. In another example, computer system 110 may obtain an accident report and/or an accident image from a car insurance provider, in step 440. AI engine 114 may analyze the accident report using the text recognition techniques discussed above, in step 450. AI engine 114 and/or AR module 116 may also analyze the accident image to identify a portion of the image showing damages sustained in the accident, in step 450.

After AI engine analyzes vehicle information in step 450 and extracts vehicle history data in step 460, AR module 116 may generate an instruction for superimposing one or more indicators on a live image of a vehicle to depict relevant vehicle information based on the extracted vehicle history data. For example, AR module 116 may, in step 470, identify one or more portions of the vehicle associated with the vehicle history data. In some embodiments, AR module 116 may identify the portion(s) based on the recognized text provided by Al engine 114. For example, Al engine 114 may analyze report 500 and recognize that, on Nov. 11, 2010, an accident was reported in which the vehicle sustained minor rear damage. AR module 116 may then identify the rear of the vehicle as the portion associated with the accident of Nov. 11, 2010. In another example, Al engine 114 may recognize that on Dec. 14, 2012, the vehicle was involved in an accident in which the left front sustained damages. Based on this information, AR module 116 may identify the left front portion of the vehicle to be associated with the accident of Dec. 14, 2012.

In step 480, AR module 116 may provide instructions to an AR-enabled device to superimpose an indicator on a visual representation of the vehicle at a location corresponding to the portion of the vehicle. An AR-enabled device may include any computing device capable of displaying AR contents. In some embodiments, the ability to display AR contents may be enabled on a computing device through a software application, such as a mobile app installed on a smart phone or tablet. For example, a smart phone equipped with a camera may constitute an AR-enabled device after an AR mobile application is installed on the phone, where the camera may be used to capture live video of an environment surrounding a user of the phone, and the AR mobile application may be configured to superimpose contents to the live video, thus creating an AR depiction of the environment. In some embodiments, client device 120 may be used as the AR-enabled device. In other embodiments, a user may use different devices to perform the tasks of taking a photo of the vehicle and depicting vehicle information in augmented reality. For example, a user may use a smart phone to take a phone of the vehicle, and use a tablet to show the vehicle information in AR to take advantage of a bigger screen size of the tablet.

Figure 6A:
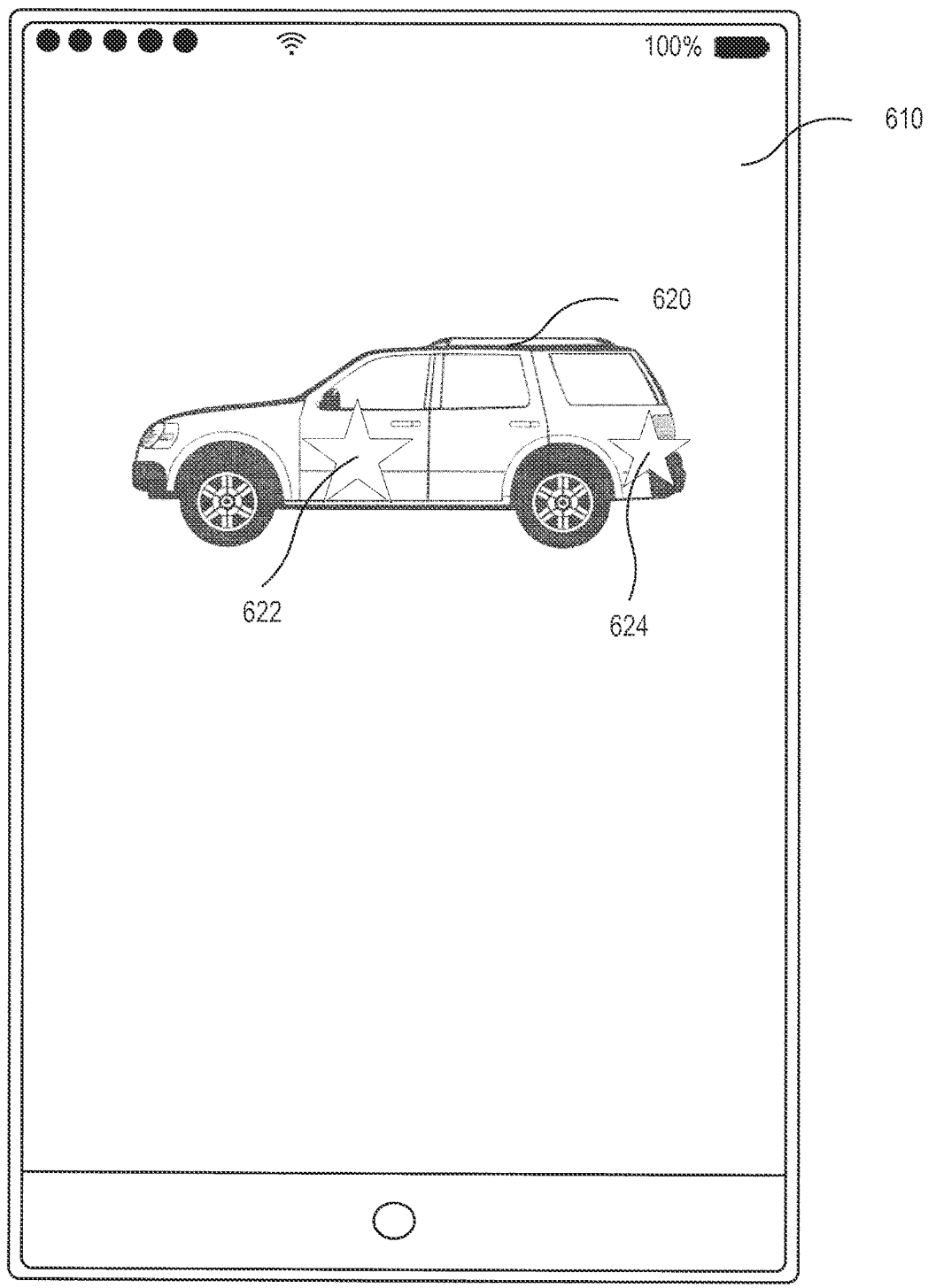
FIGS. 6A-6C are exemplary user interfaces depicting vehicle information in augmented reality, consistent with the disclosed embodiments.
Figure 6B:
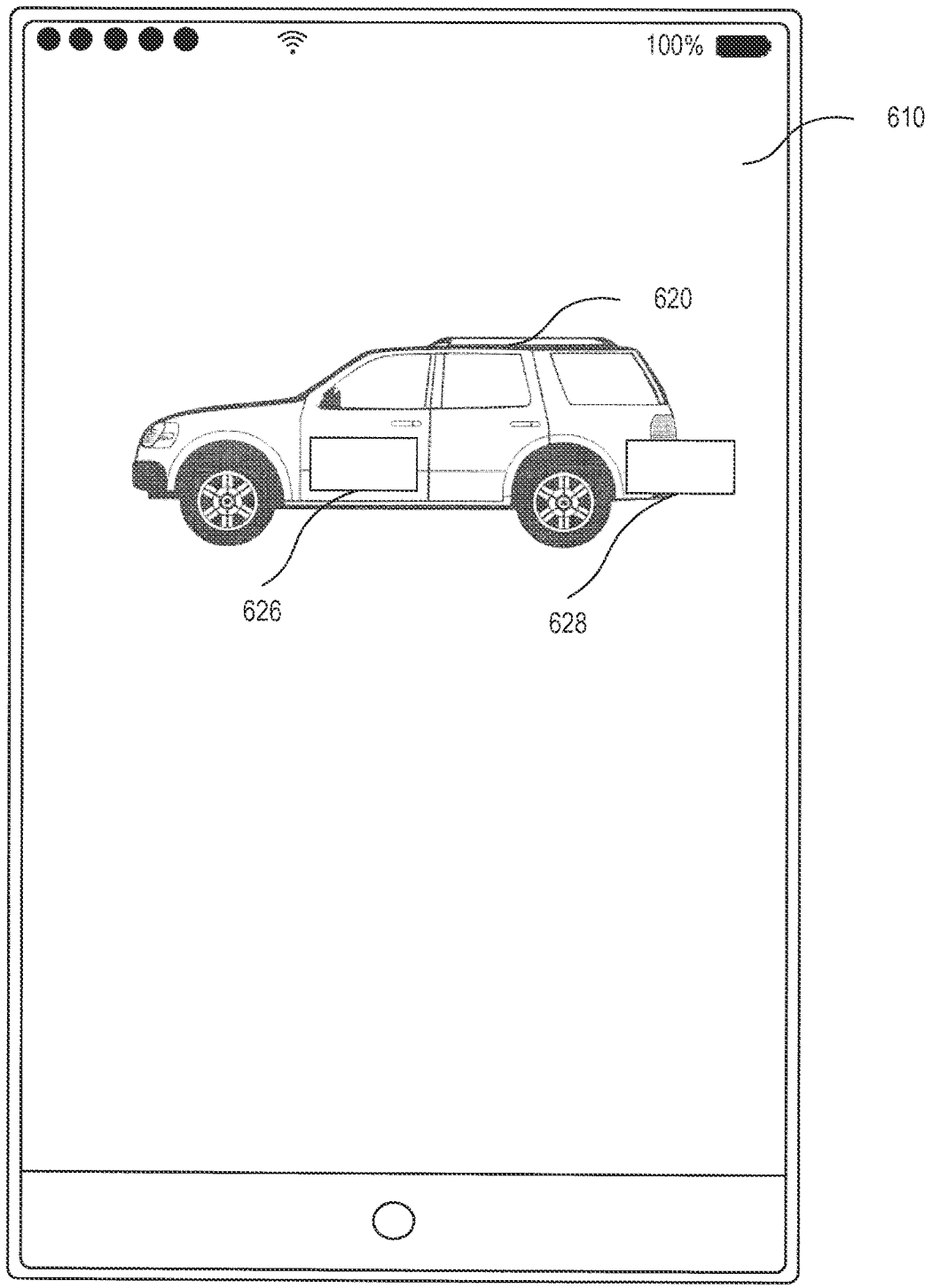
Figure 6C:
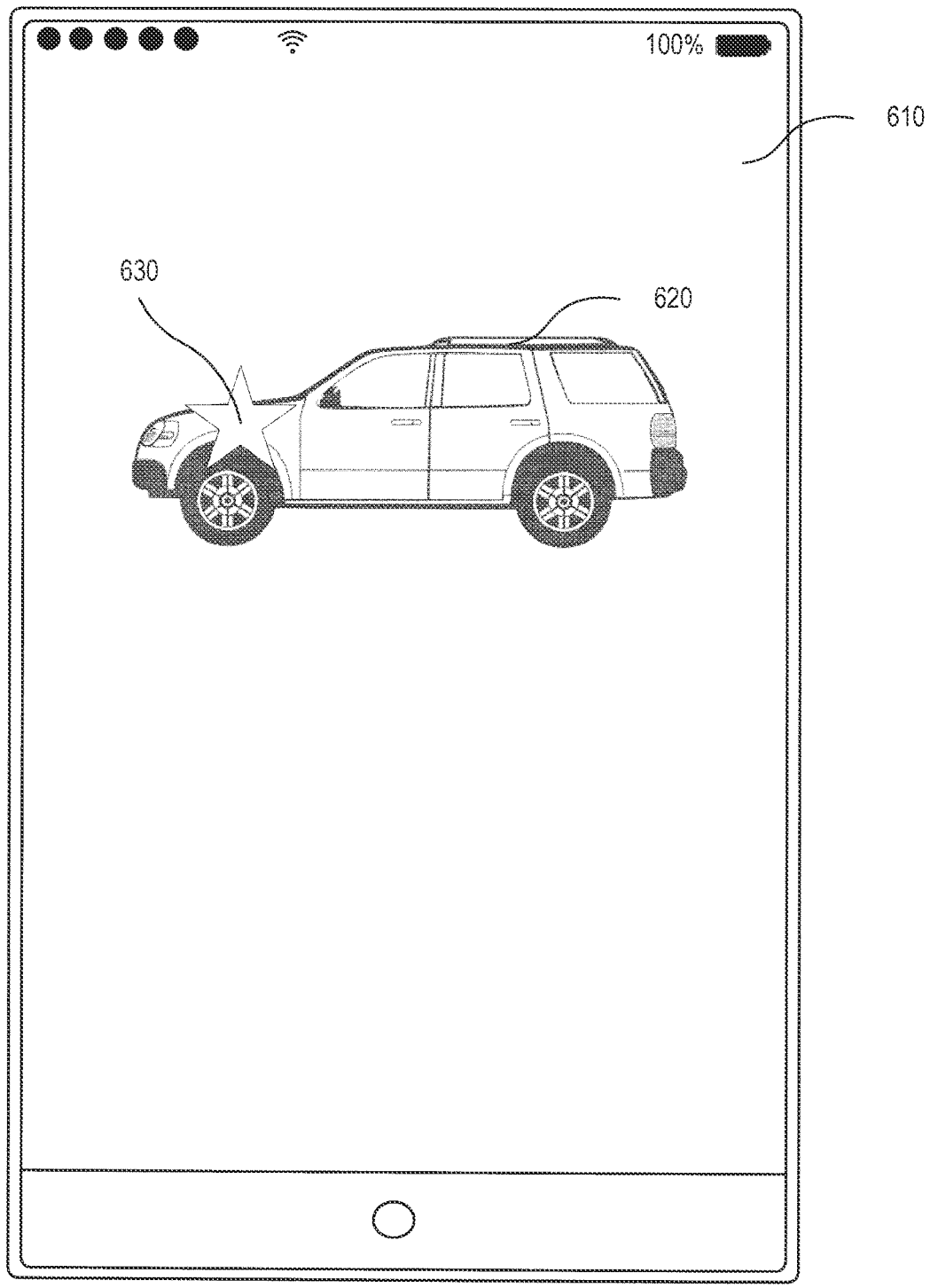

FIG. 6A-6C illustrate exemplary indicators superimposed on an image of a car. Referring to FIG. 6A, a user interface 610 is displayed on a screen of client device 120, showing an image of a car 620 superimposed by indicators 622 and 624. In some embodiments, car image 620 may be a live image, for example, a live video captured by client device 120. For example, a user of client device 120 may take a live video of a car using image sensor 240. While the live image 620 is shown on the interface 610, indicators 622 and 624 may be superimposed on image 620 at the locations corresponding to the portions identified by AR module 116 based on the vehicle history data extracted by Al engine 114. In some embodiments, the indicators may be moving if the user changes the angle or position of client device 120, such that the indicators track the correct locations corresponding to the identified portions.

As discussed above, information of an identified portion may be saved in various forms. When a portion is identified using text description or encoded notes, AR module 116 may analyze the live image 620 to recognize different parts of a vehicle displayed in live image 620, and locate the identified portion by matching the text description/encoded notes to the corresponding recognized vehicle part in live image 620. In another example, when a portion is identified using pictural information such as an image of the portion, AR module 116 may perform image matching to match the image of the portion with a corresponding part of vehicle in live image 620. AR module 116 may also recognize different parts of a vehicle, and use image location information such as pixel numbers to locate the identified portion on the vehicle displayed in live image 620. After the identified portion is located, one or more indicators may be superimposed to the live image at the location corresponding to the identified portion. When the live image changes, for example resulting from a change of angle or position, the above described locating process may be updated on the fly such that the identicator(s) can track the correct location corresponding to the identified portion.

As shown in FIG. 6A, the indicators may be in the form of marks. For example, a mark may include any suitable geometrical shapes, arrows, or a rendering of the corresponding part of the vehicle with highlighting or colors. The mark may also represent a degree of damages sustained in an accident. For example, as shown in FIG. 6A, indicator 624 is a smaller mark than indicator 622, which may represent that the rear of the car sustained less severe damage than the front door on the driver's side. Other ways of showing the degree of damages may also be used. For example, different degrees of damage may be indicated using different colors, different shades, different highlighting, etc.

FIG. 6B shows another embodiment of depicting vehicle information in AR. As shown in FIG. 6B, indicators 626 and 628 may be images, for example, photos, showing the actual accident damage. As discussed above, the photos may be obtained from one of the information sources 140-150, such as a car insurance provider, which maintains insurance claim records. Photos of actual accident damages may accompany the insurance claim reports and may be obtained by computer system 110 based on vehicle identification information. The photos may be sent to client device 120 by computer system 110 via communication interface 118, and AR module 116 may provide instructions to client device 112 to display the photos in an AR manner, such as superimposing the photos on the live image of the car at the locations corresponding to their respective accidents. For example, image 628 may be a photo showing the damage of the rear bumper, and image 626 may be a photo showing the damage of the front door on the driver's side. By showing the actual damage images to a user in AR, the user may better appreciate the degree and severity of the damage than reading text on a report.

Other vehicle information may also be depicted in AR. For example, FIG. 6C shows an embodiment in which an indicator 630 is superimposed on car image 620 showing maintenance or service information. As discussed above, maintenance records may be extracted by Al engine 114 from a vehicle history report. Al engine 114 may determine, based on the extracted maintenance records, whether the vehicle missed any service, or whether the maintenance records reveal any issues of the car. In some embodiments, Al engine 114 may also extract recall information from the vehicle history report or from one of the information sources 140-150, such as a car manufacturer, and determine if the remedial service has been performed to address the recall. After Al engine 114 determines a potential issue, for example, the engine of the car misses an oil change, Al engine 114 may communicate this information to AR module 116, which may identify the portion of the vehicle corresponding to the issue, in this case the engine, and provide instruction to client device 120 to superimpose indicator 630 on the engine part of the car image to alert the user that the engine needs service. In some embodiments, relevant information may also be displayed along with indicator 630. For example, in the above example that the engine misses an oil change, the date of the last oil change, the miles since the last oil change, etc. may be displayed. Different colors, shadings, highlighting, etc. may be used to indicate the severity of the issue.

The above-described processes may be implemented as a computer program or application or as a plugin module or sub-component of another application. Some of the described processes may be executed by computing system 200 and/or 300 as part of system 100. The described techniques may be varied and are not limited to the examples or descriptions provided.

Embodiments disclosed herein may provide improved and streamlined user experience by depicting relevant vehicle information in an intuitive and informative manner, namely in augmented reality, to assist a consumer to make purchase decisions in buying a vehicle. In some embodiments, the disclosed techniques for superimposing vehicle information, such as accident/maintenance data, on a particular portion of a vehicle may also be implemented in a virtual reality (VR) environment. Thus, the disclosed techniques are not necessarily limited to AR. In some embodiments, the disclosed techniques may be used in a combined AR and VR environment, also referred to as a mixed reality (MR) environment.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which are non-exclusive. For example, aspects of the disclosed embodiments are described as being associated with data stored in memory, and one skilled in the art will appreciate that these aspects can be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. A system for facilitating an augmented reality presentation by generating an accident impact location indicator for an accident-impacted vehicle portion in connection with an augmented reality representation of the vehicle, the system comprising:
   at least one processor in communication with an augmented reality-enabled device; and
   at least one storage medium storing instructions that, when executed by the at least one processor, cause the at least one processor to perform operations comprising:
      analyzing vehicle information using an artificial intelligence engine and obtaining vehicle history information including accident-related history of a vehicle;
      identifying, using the vehicle history information, a vehicle portion associated with the vehicle history information that was impacted by an accident, the vehicle portion being a portion of the vehicle;
      providing instructions, based on the vehicle history information, to the augmented reality-enabled device to perform operations including:
         identifying, in an augmented reality representation of the vehicle, a location corresponding to the vehicle portion impacted by the accident, and
         superimposing an accident impact location indicator on the augmented reality representation of the vehicle on the location corresponding to the vehicle portion impacted by the accident; and
      post-processing the vehicle history information based on a predefined lexicon.

2. The system of claim 1, wherein the accident impact location indicator includes a mark representing a degree of damage severity sustained in the accident.

3. The system of claim 2, wherein the accident impact location indicator includes a first mark that is rendered in a first format different from a second format of a second mark, the first mark representing a first degree of the damage severity and the second mark representing a second degree of the damage severity.

4. The system of claim 2, wherein the degree of damage severity is obtained based on a text in the vehicle history information describing the damage severity.

5. The system of claim 1, wherein the accident impact location indicator includes an image.

6. The system of claim 1, wherein the augmented reality representation of the vehicle comprises a live image of the vehicle captured by the augmented reality-enabled device.

7. The system of claim 6, wherein a position of the accident impact location indicator changes based on a real-time change in the live image due to a change in an angle or a position of the augmented reality-enabled device.

8. A method for processing vehicle information for depiction in augmented reality, the method comprising:
   receiving vehicle information associated with a vehicle;
   analyzing the vehicle information using an artificial intelligence engine and extracting vehicle history information from the vehicle information, wherein the vehicle history information includes accident-related history of the vehicle;
   identifying, using the vehicle history information, a vehicle portion associated with the vehicle history information that was impacted by an accident, the vehicle portion being a portion of the vehicle;
   providing instructions, based on the vehicle history information, to a client device to perform operations including:
      identifying, in an augmented-reality visual representation of the vehicle, a location corresponding to the vehicle portion impacted by the accident, and
      superimposing an indicator on the augmented-reality visual representation of the vehicle on the location corresponding to the vehicle portion impacted by the accident; and
   post-processing the vehicle history information based on a predefined lexicon.

9. The method of claim 8, wherein the indicator includes a mark representing a degree of damage severity sustained in the accident.

10. The method of claim 9, wherein the indicator includes a first mark that is rendered in a first format different from a second format of a second mark, the first mark representing a first degree of the damage severity and the second mark representing a second degree of the damage severity.

11. The method of claim 9, wherein the degree of damage severity is obtained based on a text in the vehicle history information describing the damage severity.

12. The method of claim 8, wherein the indicator includes an image.

13. The method of claim 12, wherein the image corresponds to an image of a damage sustained by the vehicle at the location the indicator is superimposed.

14. The method of claim 8, wherein the indicator includes textual description of the vehicle portion impacted by the vehicle.

15. The method of claim 8, wherein the augmented-reality visual representation of the vehicle comprises a live image of the vehicle captured by the client device.

16. The method of claim 15, wherein a position of the indicator changes based on a real-time change in the live image due to a change in an angle or a position of the client device.

17. A non-transitory computer-readable medium for processing vehicle information for depiction in augmented reality, comprising instructions that, when executed by one or more processors, cause operations comprising:
   receiving vehicle information associated with a vehicle;
   analyzing the vehicle information using an artificial intelligence engine and extracting vehicle history information from the vehicle information, wherein the vehicle history information includes accident-related history of the vehicle;
   identifying, using the vehicle history information, a vehicle portion associated with the vehicle history information that was impacted by an accident, the vehicle portion being a portion of the vehicle;
   providing instructions, based on the vehicle history information, to a client device to perform operations including:
      identifying, in an augmented-reality visual representation of the vehicle, a location corresponding to the vehicle portion impacted by the accident, and
      superimposing an indicator on the augmented-reality visual representation of the vehicle on the location corresponding to the vehicle portion impacted by the accident; and
   post-processing the vehicle history information based on a predefined lexicon.

18. The computer-readable medium of claim 17, wherein the indicator includes a mark representing a degree of damage severity sustained in the accident.

19. The computer-readable medium of claim 17, wherein the augmented-reality visual representation of the vehicle comprises a live image of the vehicle captured by the client device.

20. The computer-readable medium of claim 19, wherein a position of the indicator changes based on a real-time change in the live image due to a change in an angle or a position of the client device.

* * * * *